US009830631B1

(12) United States Patent
Dhua et al.

(10) Patent No.: US 9,830,631 B1
(45) Date of Patent: Nov. 28, 2017

(54) IMAGE RECOGNITION RESULT CULLING

(71) Applicant: A9.com, Inc., Palo Alto, CA (US)

(72) Inventors: Arnab Sanat Kumar Dhua, Mountain View, CA (US); Sunil Ramesh, San Jose, CA (US)

(73) Assignee: A9.com, Inc., Palo Alto ( * ) Notice: Subject to any disclaimer, the term of this patent is extended or adjusted under 35 U.S.C. 154(b) by 881 days.

(21) Appl. No.: 14/269,034

(22) Filed: May 2, 2014

(51) Int. Cl.
*G06Q 30/00* (2012.01)
*G06Q 30/06* (2012.01)
*G06K 9/62* (2006.01)
*G06K 9/46* (2006.01)
*G06F 17/30* (2006.01)

(52) U.S. Cl.
CPC ... *G06Q 30/0623* (2013.01); *G06F 17/30277* (2013.01); *G06K 9/46* (2013.01); *G06K 9/6202* (2013.01); *G06Q 30/0631* (2013.01)

(58) Field of Classification Search
CPC ....... G06Q 30/0601–30/0645; G06F 17/30277
USPC ............................. 705/26.1–27.2; 707/E17.03
See application file for complete search history.

(56) References Cited

U.S. PATENT DOCUMENTS

| | | | | |
|---|---|---|---|---|
| 8,635,124 | B1* | 1/2014 | Hamilton | G06Q 30/0601 705/26.1 |
| 2005/0162523 | A1* | 7/2005 | Darrell | G06F 17/30864 348/211.2 |
| 2009/0070110 | A1* | 3/2009 | Erol | G06F 17/30247 704/236 |
| 2009/0254543 | A1* | 10/2009 | Ber | G06F 17/30675 |
| 2010/0241650 | A1* | 9/2010 | Chittar | G06F 17/30259 707/769 |
| 2011/0145713 | A1* | 6/2011 | Williams | G06Q 30/0603 715/738 |

OTHER PUBLICATIONS

AutoTrader.com and internet broadcasting launch online 'trade up your car' sweepstakes. (Oct. 25, 2005). PR Newswire Retrieved from https://dialog.proquest.com/professional/professional/docview/675015352?accountid=142257.*

* cited by examiner

*Primary Examiner* — Resha Desai
(74) *Attorney, Agent, or Firm* — Hogan Lovells US LLP

(57) ABSTRACT

Various embodiments enable an image recognition system reduce the number image match candidates before running a full-fledged pair-wise match on all image match candidates. In order to accomplish this, each inventory image can be assigned to a group. For example, a title for a book sold by an electronic marketplace could be available in multiple languages, in multiple bindings, and the book could be available in print, audio book, or electronic book. Each one of these variations could be associated with its own similarly looking inventory image, each of which could be returned as a valid match to a query image for the book. Accordingly, the inventory images for these variations could be assigned to a group for the book and, instead of geometrically processing an image for each variation, the image match system can process a single image representing all of the variations.

15 Claims, 10 Drawing Sheets

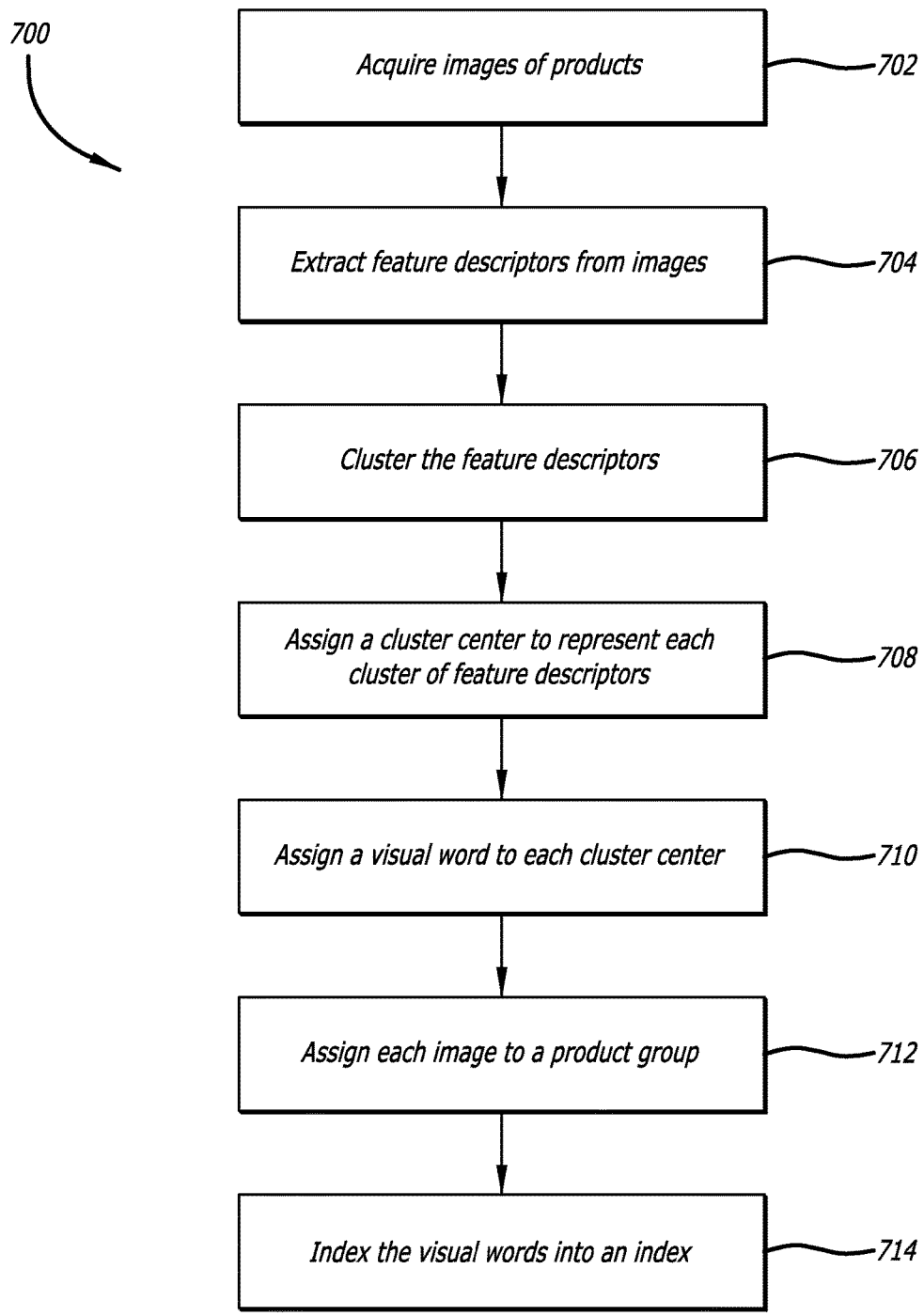

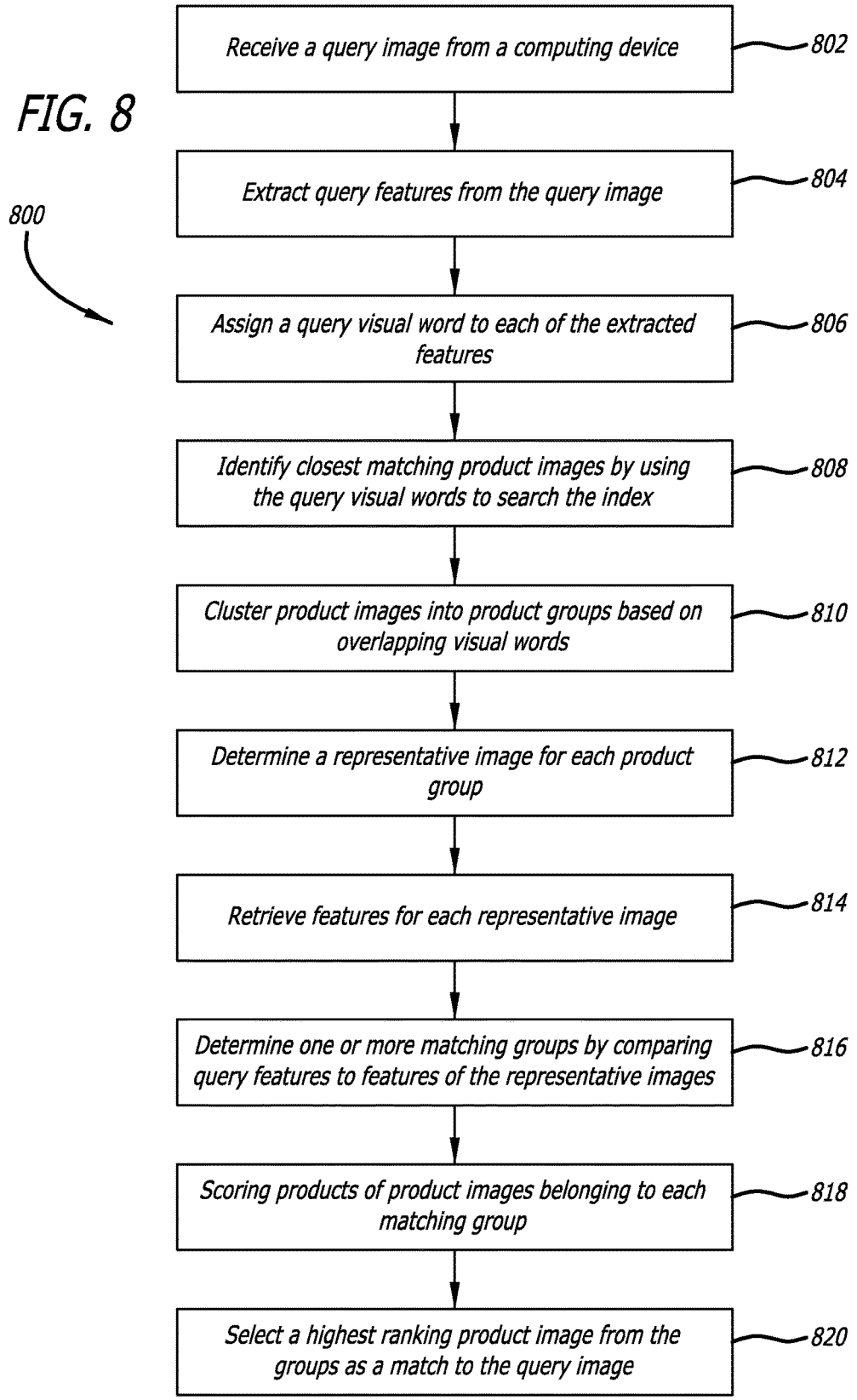

IMAGE RECOGNITION RESULT CULLING

BACKGROUND

Image matching is a technique being used in computer vision, object recognition, motion tracking, three-dimensional (3D) modeling, and the like, which can be performed to check whether two images contain the same content. For example, a user interested in determining availability of a book can capture an image of the book and submit the image to an image matching service as a query image in order to be provided with information associated with the book in return. In order to accomplish this, a conventional object recognition system receives a number of top potentially matching candidates for the query image from an image match index, where each of these candidates is given a search score. These candidates are subsequently sorted by their search score, and the top results are chosen for further processing. A minimum and maximum number of candidates are used to determine these top results. Such a matching system then geometrically processes these candidates, filtering out non-matching candidates along the way. Geometric processing, however, is an expensive, yet necessary step for preventing nonmatching and, therefore, incorrect candidates from being displayed to a user.

Accordingly, once a corresponding match is identified, information associated with the matching candidate (e.g., information for purchasing the book) can be provided and displayed to the user on their computing device. As similar more images begin to look similar or are near duplicates of each other, however, the ideal match (visual and/or relevant) may not end up being in the number of top potentially matching candidates for a variety of reasons, such as poor quality database images, distracting query image features causing the wrong results to be given higher scores, different scales between the query and database images, and the like. This problem can be addressed by increasing the maximum number of candidates to be geometrically process, however, geometrically verifying each match is computationally expensive and increasing the number of candidates can add significant latency to each query and is, therefore, not considered a practical solution. Accordingly, a method for processing a larger number of candidate images, that does not significantly increasing latency, is desirable.

BRIEF DESCRIPTION OF THE DRAWINGS

Various embodiments in accordance with the present disclosure will be described with reference to the drawings, in which:

FIG. 7 illustrates an example pre-processing flow whereby images are assigned to groups for culling image match candidates in accordance with at least one embodiment;

FIG. 8 illustrates an example run-time flow for culling image match candidates in accordance with at least one embodiment;

DETAILED DESCRIPTION

Systems and methods in accordance with various embodiments of the present disclosure may overcome one or more of the aforementioned and other deficiencies experienced in conventional approaches to providing information based at least in part upon a target image or other such object. In particular, various approaches may allow for an image recognition system to cull or reduce the number of a set of image match candidates before running a full-fledged pairwise match on all image match candidates. Accordingly, as the size of image collections used for matching images becomes larger, the number of similar to near duplicate images has increased. Therefore, as more images are indexed, it is becoming increasingly possible to get several dozen valid matches for a single query image. Not only is geometrically verifying all of these valid matches computationally expense and redundant, it creates issues, such as determining which of these valid matches is the best or most ideal to provide to a user or whether the most ideal match was even within the top matches to be geometrically verified.

In order to address at least some of these issues, the image match candidates can be clustered into groups or equivalence classes at runtime. For example, a title for a book sold by an electronic marketplace could be available in multiple languages, in multiple bindings, the book could be available in print, audio book, or electronic book (i.e., E-reader), and further sold by the electronic marketplace and additionally by third-party sellers. Each one of these variations could be associated with its own similarly looking inventory image, each of which could be returned as a valid match to a query image for the book. Accordingly, in this example, the image match candidates associated with each of these variations could be clustered into group for the book and, instead of geometrically processing an image for each of these variations, the image match system can process a single image representing all of these variations.

Various other functions and advantages are described and suggested below as may be provided in accordance with the various embodiments.

Figure 1:
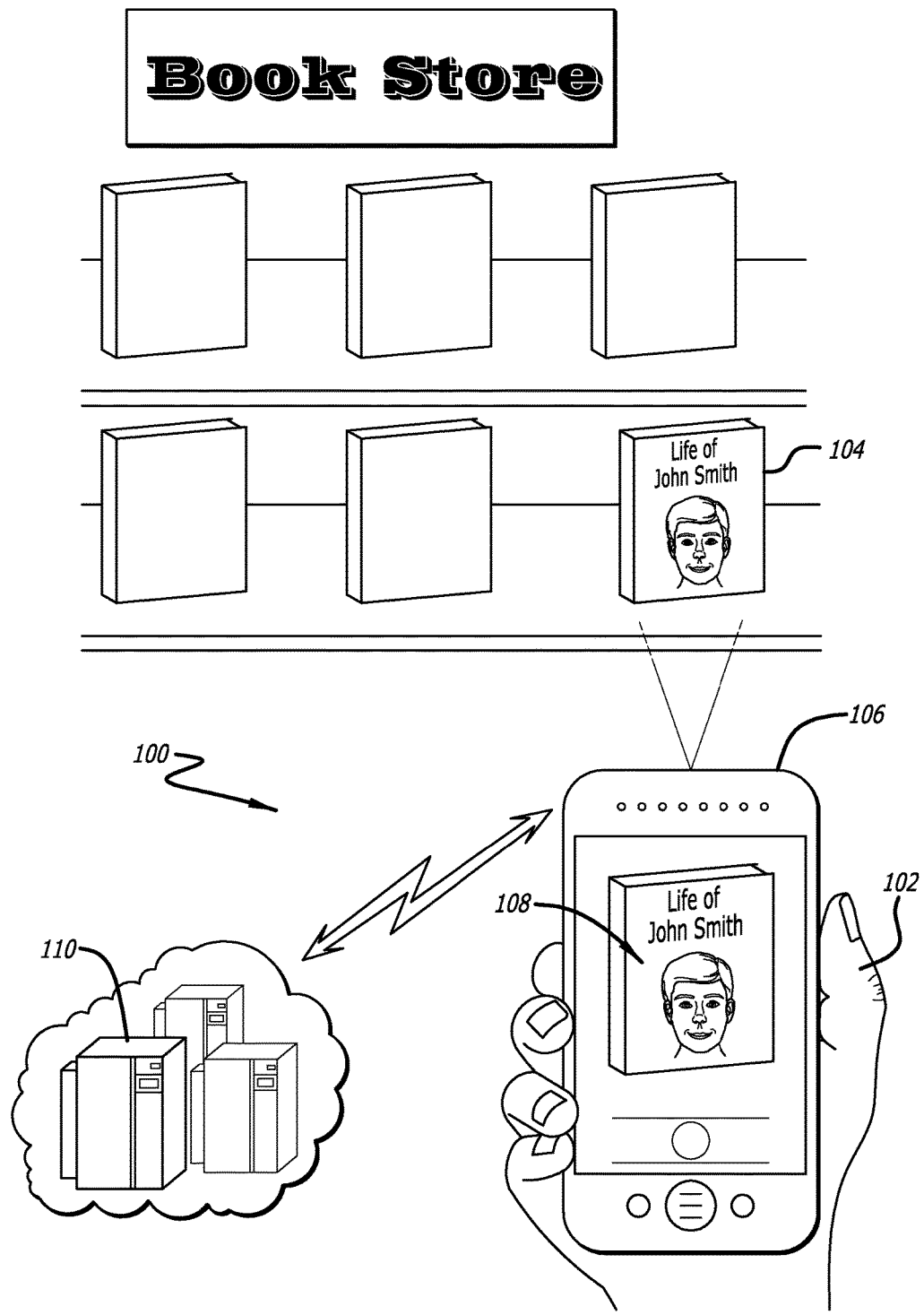
FIG. 1 illustrates an example of a user capturing an image of an item to submit as a query image using computing device in accordance with at least one embodiment.

FIG. 1 illustrates example situation 100 wherein user 102 is interacting with computing device 106. Although a portable computing device (e.g., a smart phone, an e-book reader, or tablet computer) is shown, it should be understood that various other types of electronic devices that are capable of determining and processing input can be used in accordance with various embodiments discussed herein. These devices can include, for example, desktop computers, notebook computers, personal data assistants, cellular phones, video gaming consoles or controllers, smart televisions, a wearable computer (e.g., a smart watch or glasses), and portable media players, among others.

In this example, computing device 106 has at least one image capture element, such as a camera or camera sensor, operable to perform functions such as image and/or video capture. Each image capture element may be, for example, a charge-coupled device (CCD), a motion detection sensor, or an infrared sensor, or can utilize another appropriate image capturing technology. In this example, user 102 is interested in obtaining information about item 104 which, in this example, is a biography of John Smith available for purchase in a store. The information that the user is interested in obtaining could include, for example, information related to the product's manufacture, stock availability information at another store or electronic marketplace, price information to see whether item 104 is cheaper from another retailer, or the like.

In order to obtain this information, user 102 can position computing device 106 such that at least the relevant portion of item 110 is within a field of view of at least one camera of the computing device. The resulting image 108 can then be displayed on a display screen of the computing device. Image 108 can be a still image that was captured by the camera, or can be a frame of a "live" view as captured by a video mode of the camera, etc. Using a conventional approach, user 102 can cause image 108 to be captured and uploaded to server 110 of, for example, an image matching service and, therefore, capable of running one or more image analysis or object recognition algorithms to attempt to recognize item 104 within image 108.

Figure 2:
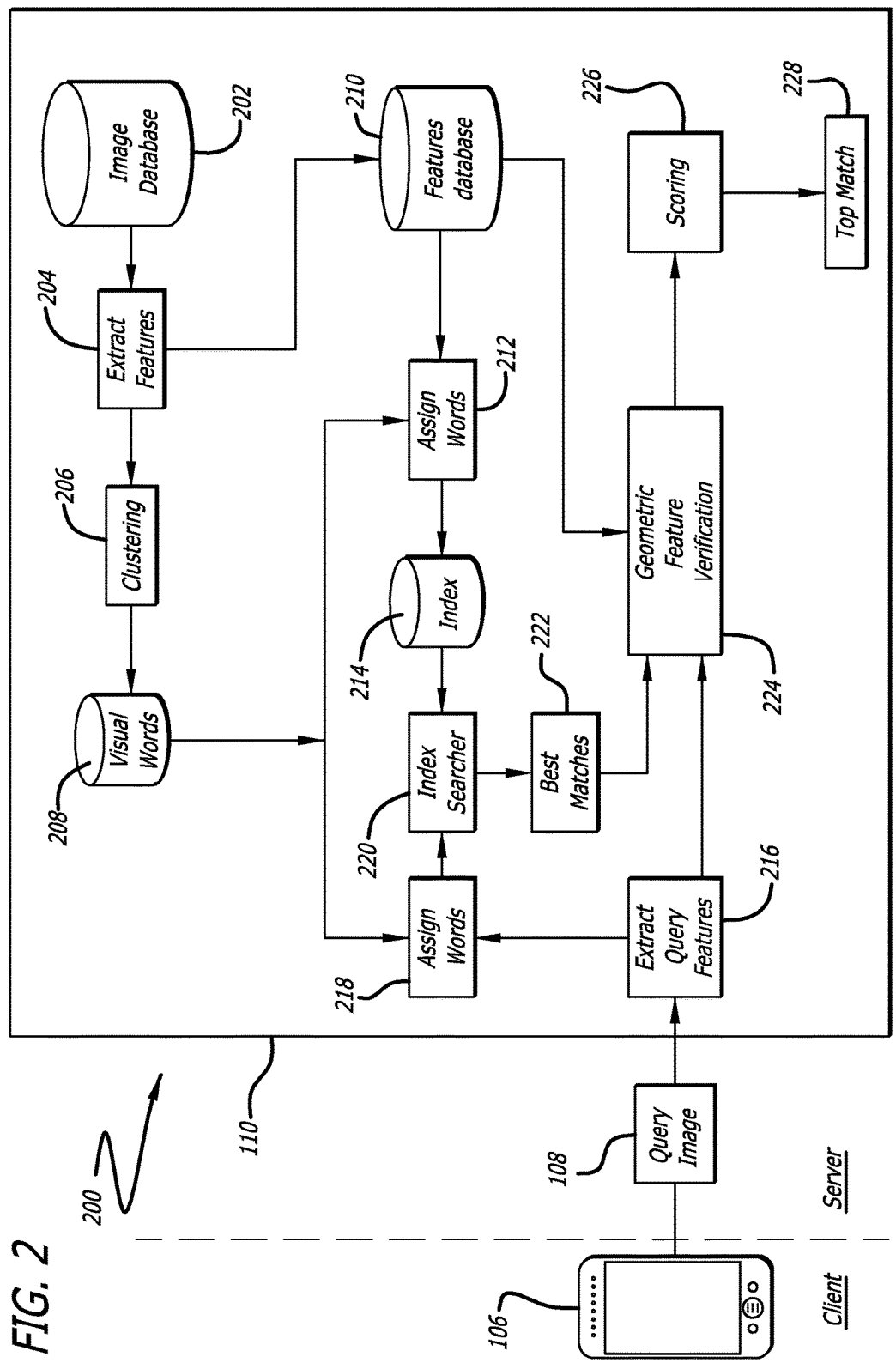
FIG. 2 illustrates an example image match run-time system flow for culling image match candidates in accordance with at least one embodiment.

FIG. 2 illustrates an example system flow 200 for an example an image matching service when image 108 is uploaded to server 110 in accordance with at least one embodiment. It should be understood that, for this and other processes discussed herein, there can be additional, fewer, or alternative steps, performed in similar or alternative steps, or in parallel, within the scope of the various embodiments unless otherwise stated. In this example, image database 202 contains images of inventory items. First, before image 108 is uploaded, feature descriptors are extracted 204 from each image contained in or added to image database 202. Such an image matching service will often obtain multiple images of objects from different angles in order to be able to match an image of a respective object, such as image 108, from more than one angle or perspective. Typical image matching algorithms take advantage of the fact that an image of an object or scene contains a number of feature points (i.e., specific points in an image which are robust to changes in image rotation, scale, viewpoint or lighting conditions). Accordingly, this means that these feature points will often be present in both of two different images of an object or scene, even if the two images differ. Feature (Vector) descriptors describing each of at least a subset of features of each database image are determined to create inventory feature descriptors for database image 202. The feature descriptors may be extracted using a feature extraction algorithm, such as Accumulated Signed Gradient (ASG), a Scale-Invariant Feature Transform (SIFT) algorithm or the like. In one example, image database 202 does not exist and the actual images are discarded once the features have been extracted therefrom.

A clustering process 206 can then map each feature descriptor to a cluster center (i.e., feature quantization) using any suitable clustering algorithm (e.g., Hierarchical K-means, etc.). After the feature descriptors are clustered, the cluster centers can be assigned visual words or mapped to each of their own respective closest visual word. A visual word ID along with a corresponding cluster center are stored in visual word database 208 (e.g., Code Book) that can be used to look up a cluster center via a visual word or look up a visual word via a cluster center. Each visual word represents a small part of an image by carrying some kind of information related to its respective representative feature (e.g., color, shape, texture, etc.), or changes occurring in the pixels such as the filtering, low-level feature descriptors, and the like. Accordingly, a collection of visual words (i.e., a vocabulary) together provides information about a respective image and the content therein. This vocabulary or representation can enable the use of standard text search and retrieval techniques for image retrieval. This technique of treating image features as words is also known as a bag-of-words model (BoW). BoW can be considered a vector of occurrence counts of words describing an image, which can be represented in a histogram over local image features, for example.

In this example, the features are clustered into a value associated with their nearest corresponding cluster center. The cluster centers that geometrically describe each image are then stored in features database 210. Accordingly, words from visual word database 208 are assigned to each cluster center 212 and the visual words along with document IDs for images that they describe are stored in index 214 (e.g., a Lucene Index). Since the cluster centers (i.e., local feature descriptors) each correspond to a visual word in index 214, the numbers of times each respective visual word appears in a respective image can be determined. Each image can, therefore be described using a histogram of visual words. Accordingly, index 214 of visual words to images can be made available for image matching.

Accordingly, computing device 106 sends image 108 as a query image to server 110 of the image matching service where, upon receiving image 108, the service extracts query features 216 and calculates query features descriptors from the same using ASG or any other suitable feature extraction algorithm, as similarly discussed above. After the features are extracted, visual words are assigned 218 using the visual words from visual word database 208. These assigned words are then compared against index 214 by index searcher 220 to identify or extract the best tf-idf image matches 222. Tf-idf (term frequency-inverse document frequency) is a statistic reflecting how important an assigned word is to a respective image in index 214 and is used as a weighting factor. When retrieving matching images, each query visual word essentially votes on its matched images and the tf-idf value increases proportionally to the number matching visual words. Accordingly, the matched images can be ranked by the sum of their respective weighted votes.

Figure 3:
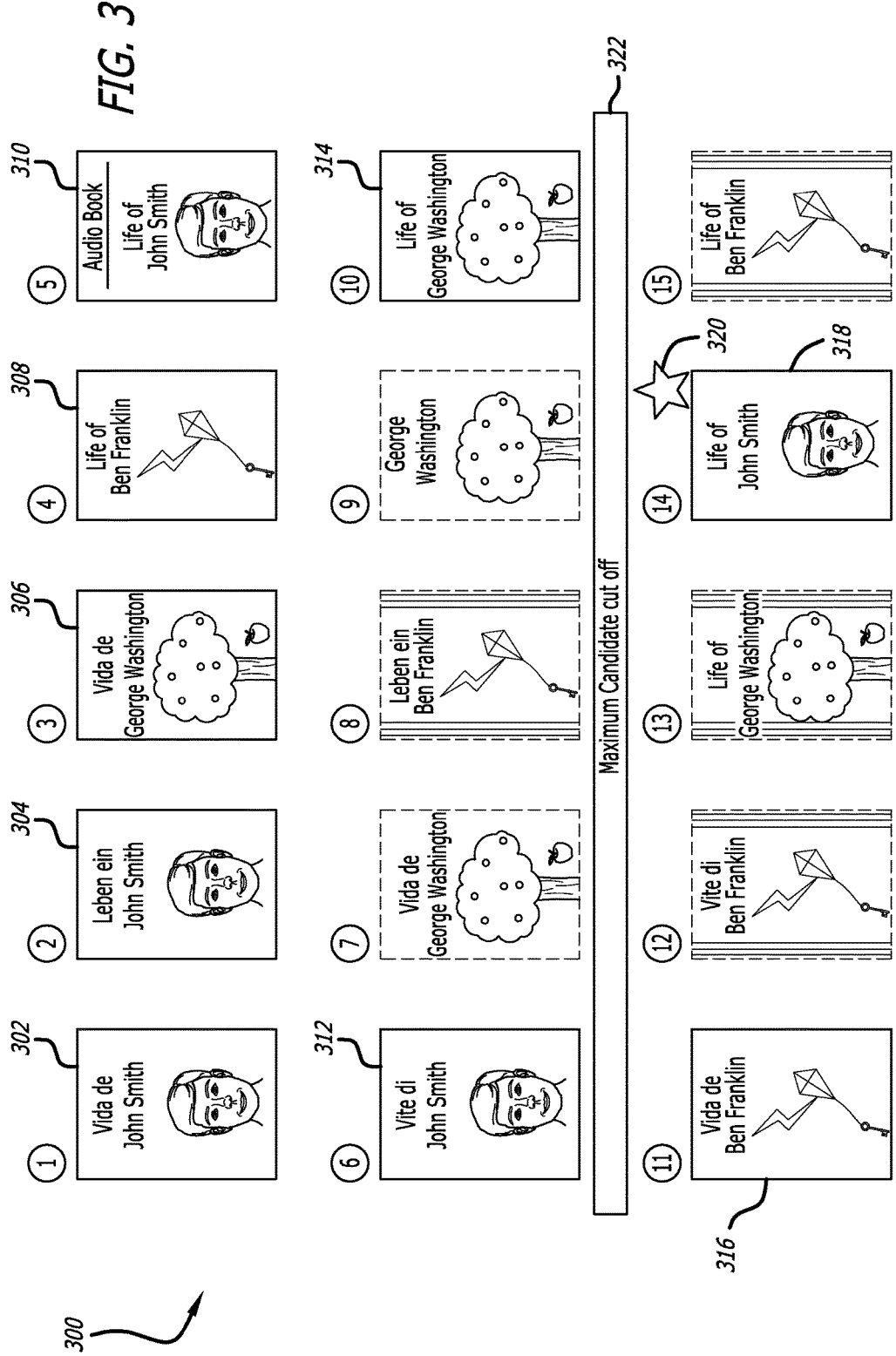
FIG. 3 illustrates example matched images from a search index in accordance with at least one embodiment.

For example, FIG. 3 illustrates example matched images 300 corresponding to a set of closest matching inventory images that could be returned by index 214 based on a number of matching visual words. In this example, there are fifteen matched images 300 which include images for the biography of John Smith, but also images for the biographies of Ben Franklin and George Washington. Further, among these fifteen matched images 300 are different versions of each of these biographies. In this example, index 214 has returned the Spanish version 302, German version 304, Audio Book version 310, Italian version 312, and English version 318 of the biography of John Smith, Spanish version 306 and English version 314 of the biography of George Washington, and the English version 308 and Spanish version 316 of the biography of Ben Franklin. Since geometric verification 224 is a computationally expensive step that adds significant latency as more images are added, only a limited number of top matches can be processed. Accordingly, as the size of image collections used for matching images becomes larger, the number of similar to near duplicate images has increased. Therefore, as more images are indexed, it is becoming increasingly possible to get several dozen valid matches for a single query image.

Accordingly, in this example, there is a maximum candidate cut off 322 that allows only the top ten matches of matched images 300 to be sent for geometric verification 224. As more images begin to look similar or are near duplicates of each other, the ideal match (English version 318) may not end up being in the number of closest matching inventory images. Accordingly, in this example, user 102 is trying to obtain information for English version 318 of the biography of John Smith which is not within the top ten matches. This can happen for a variety of different reasons including poor quality database or inventory images, distracting query image features causing the wrong results to be given higher scores, different scales between the query and database images, and the like.

Figure 4:
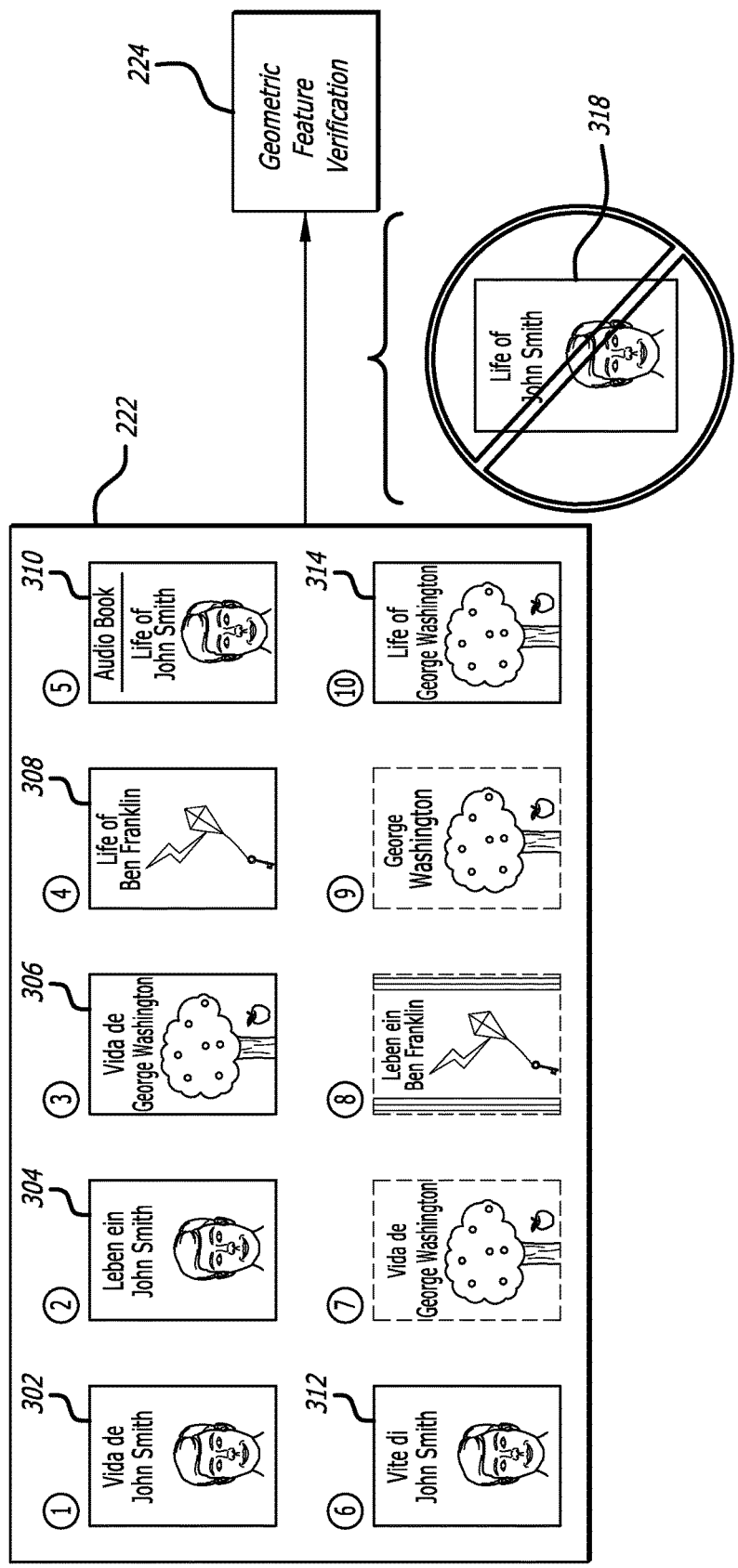
FIG. 4 illustrates example matched images being sent for geometric verification in accordance with at least one embodiment.

FIG. 4 illustrates matched images 300 above maximum candidate cut off 322 being returned sent from best tf-idf image matches 222 for geometric verification 224, where the ideal match, image for English version 318 of the biography of John Smith is not be sent. As a result, geometric verification 224 is performed on a set of images that does not include the ideal match and user 102 will, therefore, not be provided with the with most ideal information for item 104. This problem can be addressed by increasing the maximum candidate cut off 322 to enable more images be geometrically processed, however, since geometrically verifying each match adds to the computational complexity and latency, this is not a practical solution.

In at least one embodiment, an image recognition system can cull or reduce the number of matched images 300 before running geometric verification 224 on each of matched images 300. Not only is geometrically verifying all of these valid matches computationally expense and redundant, it creates issues, such as determining which of these valid matches is the best or most ideal to provide to a user or whether the most ideal match was even within the top matches to be geometrically verified.

Figure 5:
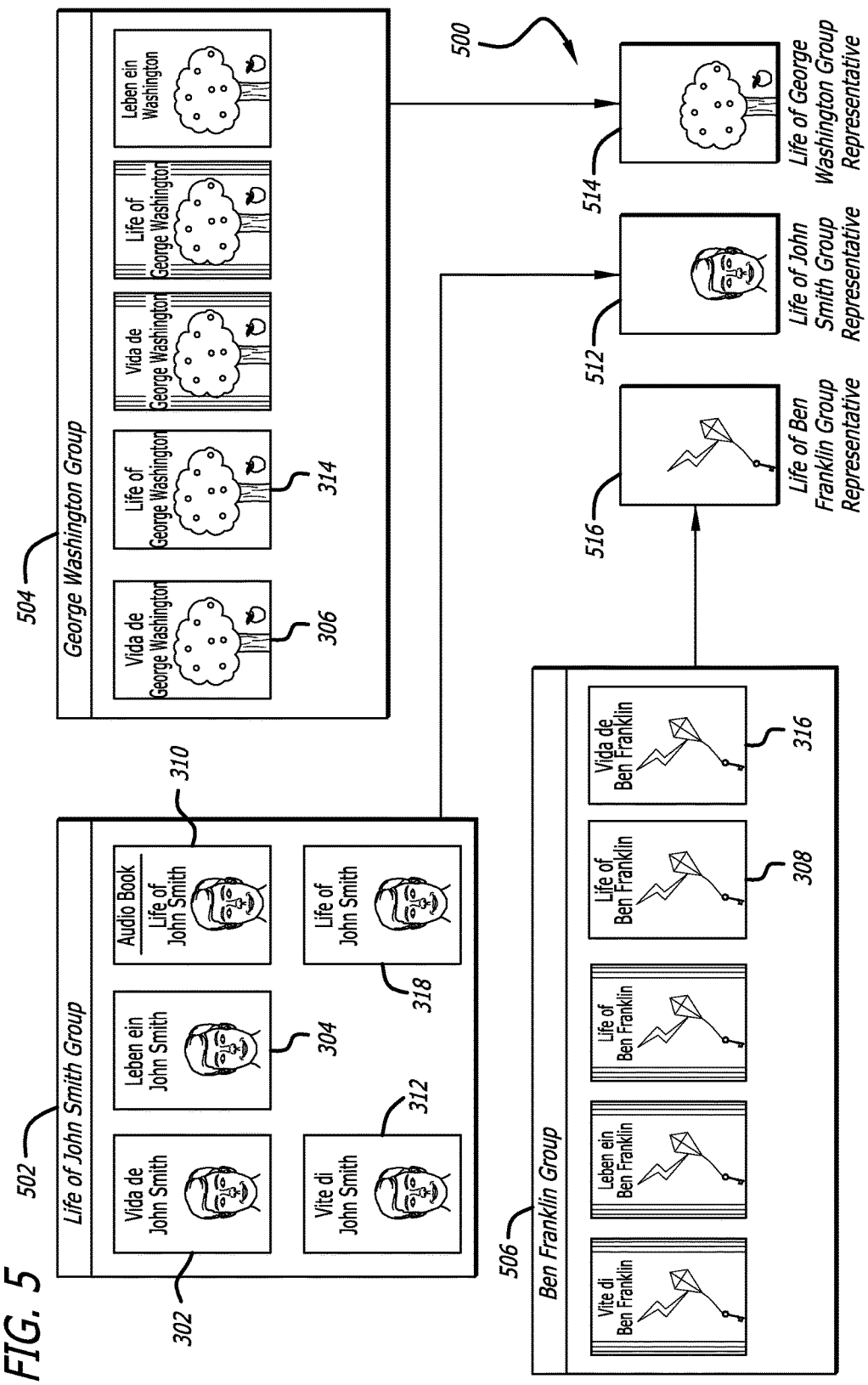
FIG. 5 illustrates example matched images grouped by item in accordance with at least one embodiment.

In order to address this issue, FIG. 5 illustrates matched images 300 grouped by item in accordance with at least one embodiment. In this example, the matched images can be clustered into groups or equivalence classes at runtime based on overlapping visual words. In this example, Spanish version 302, German version 304, Audio Book version 310, Italian version 312, and English version 318 of the biography of John Smith have been grouped into a first group 502 for the Life of John Smith, Spanish version 306, English version 314, and three other versions of the biography of George Washington have been grouped into a second group 504 for George Washington, and the English version 308, Spanish version 316, and three other version of the biography of Ben Franklin have been grouped into a third group 506 for Ben Franklin. Each one of the variations in these groups (502, 504, 506) being grouped together based on having a threshold number of the visual words in common with each other, such that each image (i.e., different versions of the same product/image) with a respective group could be returned as a valid match to a query image.

Accordingly, in this example, all matched images 300 for each of these variations clustered into a group (502, 504, 506) for the respective book and, instead of geometrically processing each and every one of matched images 300 above maximum candidate cut off 322 for each redundant variation, the image match system can process a single image that represents all of these variations. In this example, first group 502 has representative image 512, second group 504 has representative image 514, and third group 506 has representative image 516 that can be sent for geometric verification 224.

Figure 6:
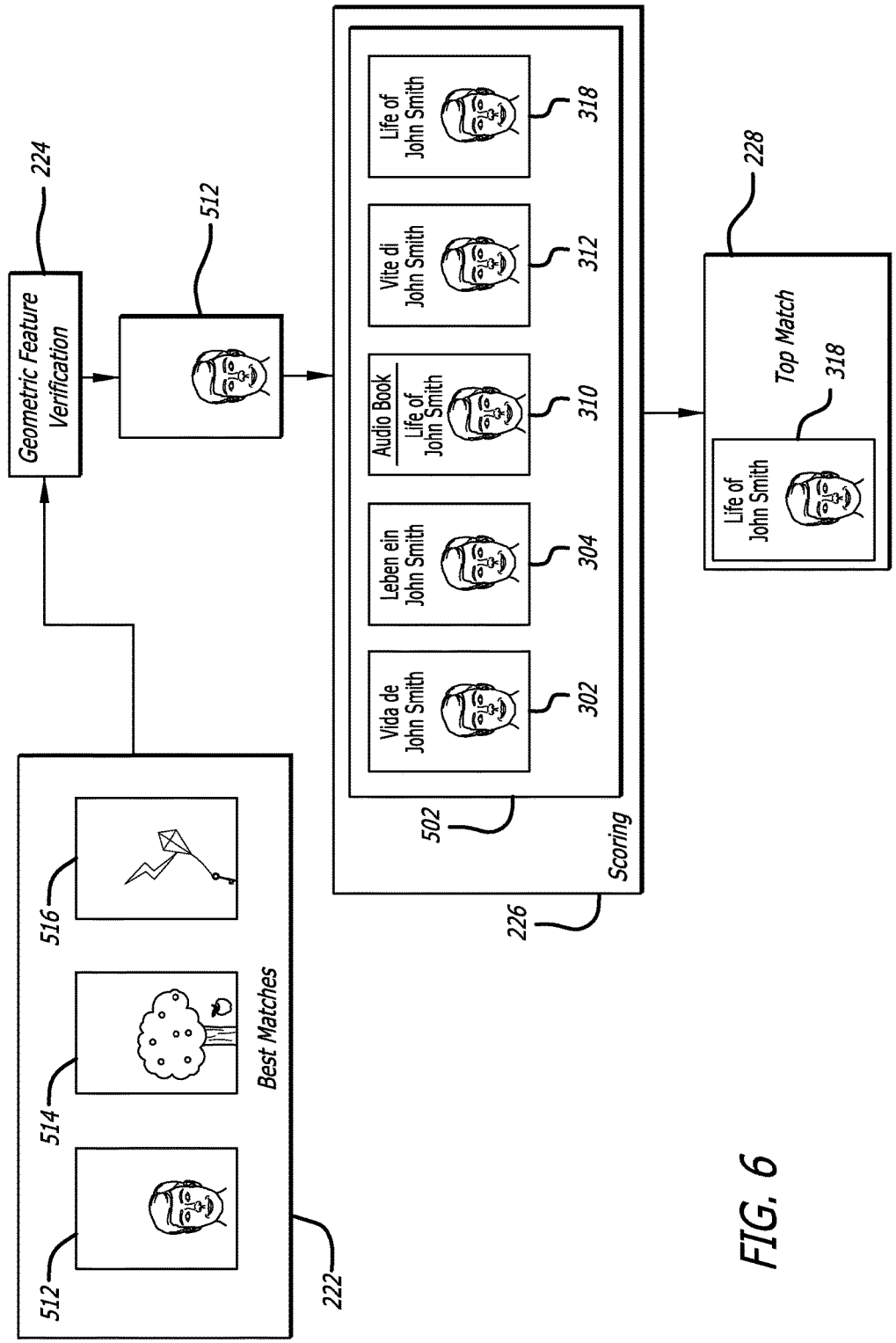
FIG. 6 illustrates example culled matched images being sent for geometric verification in accordance with at least one embodiment.

FIG. 6 illustrates representative images 500 being sent for geometric verification 224 in accordance with at least one embodiment. In this example, instead sending each and every one of matched images 300 above maximum candidate cut off 322 for geometric verification 224, the number of groups represented among matched images 300 is determined. In this example, representative image 512 can be used to represent each of the images in group 502, representative image 514 can be used to represent each of the images in group 504, and representative image 516 can be used to represent each of the images in group 506. Accordingly, each of matched images 300 is associated with one of groups (502, 504, 506) and instead of geometrically processing the ten matched images 300 above maximum candidate cut off 322, representative images 500 are sent for geometric verification 224. Accordingly, geometric feature verification 224 of representative images 500 is performed by comparing the query feature descriptors to the cluster centers of each of representative images 500. At this stage, a look up table can be used to look up cluster centers of corresponding assigned words that match the query assigned words. Accordingly, the corresponding cluster centers are retrieved from feature database 210 and compared to the extracted query features descriptors 216 using a geometric verification algorithm, such as RANSAC. Therefore, instead of geometrically processing ten images that include redundancies, only three images are processed. Accordingly, since every existing variation of an item is represented by its group, an image associated with the most ideal item will be sent for geometric verification 224 even if it is the $1000^{th}$ match as determined by best tf-idf image matches 222.

In this example, geometric verification 224 returns representative image 512 corresponding to group 502 for the Life of John Smith as the top matching group. At this stage in the process, English version 318 of the biography of John Smith (ideal match 320) has not yet been identified as the best match for user 102, however, the image corresponding to the visual appearance of English version 318 and every other version of the biography of John Smith represented by that cover, artwork, or image has been identified as a match. Accordingly, each version of the biography of John Smith or member of first group 502 is determined as a match and sent for non-visual scoring 226 taking into account features, such as a number of sales, freshness, seasonality, review count, projected shipping time, or user preferences for each item or version associated with first group 502. For example, matched images 300 could include multiple product listings for the same English version of the biography of John Smith sold by multiple third-party sellers and one that is sold by an electronic marketplace. In this example, each version would be considered a valid match, however, the listing provided by the electronic marketplace could provide superior shipping compared to the third-party sellers, which could be important user 102. Based on this scoring, English version 318 is identified as the top match 228 and information for English version 318 can be sent for display to user 102 on computing device 106.

FIG. 7 illustrates an example pre-processing flow 700 whereby images are assigned to groups for culling image match candidates in accordance with at least one embodiment. It should be understood that, for this and other processes discussed herein, there can be additional, fewer, or alternative steps, performed in similar or alternative steps, or in parallel, within the scope of the various embodiments unless otherwise stated. In this example, inventory images of items, such as products, landmarks, or other objects, are acquired by a system for indexing 702.

In this example, feature descriptors are extracted from each of the inventory image 704. Feature (Vector) descriptors describing each of at least a subset of features of each inventory image are determined to create inventory feature descriptors for a database. The feature descriptors may be extracted using a feature extraction algorithm, such as Accumulated Signed Gradient (ASG), a Scale-Invariant Feature Transform (SIFT) algorithm or the like. In this example, the features are clustered 706 into a value associated with their nearest corresponding cluster center 708. The cluster centers that geometrically describe each image are then stored in features database. Accordingly, words from a visual words database are assigned to each cluster center 710 and the visual words along with document IDs for images that they describe are stored in index (e.g., a Lucene Index). Each of the inventory images, in this example is assigned to a product group 712. For example, different versions of an item corresponding to the inventory images can be classified into disjoint sets of equivalent images based on overlapping visual words. Alternatively, the inventory images can be manually associated with or assigned to a group when they are indexed or inputted into a database. Since the cluster centers (i.e., local feature descriptors) each correspond to a visual word in index 714, the numbers of times each respective visual word appears in a respective image can be determined. Each image can, therefore be described using a histogram of visual words.

FIG. 8 illustrates an example run-time flow 800 for culling image match candidates in accordance with at least one embodiment. In this example, a query image from a computing device is received 802. Upon receiving image, an image match service extracts query features 804 and calculates query features descriptors from the same using ASG or any other suitable feature extraction algorithm, as similarly discussed above. After the features are extracted, visual words are assigned 806. These assigned words are then compared against an index to identify or extract the best image matches 808. For example, tf-idf (term frequency-inverse document frequency), which is a statistic reflecting how important an assigned word is to a respective image can be used as a weighting factor. When retrieving matching images, each query visual word essentially votes on its matched images and the tf-idf value increases proportionally to the number matching visual words.

In this example, each of the closest matching product images clustered into product groups based on overlapping visual words 810, where each product group can include one or more versions of a respective product. In one example, clustering the closest matching product images into product groups includes comparing the visual words of each matching product image to the other product images to identity visual words in common between respective images. When two images have a threshold number of visual words in common, the two images are assigned or grouped into the same group or equivalence class. Accordingly, a representative image for each product group is determined 812 and feature for each representative image are retrieved 814. A matching group for the query image can be determined by comparing query features to features for a representative image from each product group represented among the set of closest matching inventory images 816. Accordingly, different versions of the product assigned to the matching group are ranked or scored 818. In one example, this ranking is non-visual and can be based in part on a number of sales, freshness, seasonality, review count, projected shipping time, or user preferences. Accordingly. a highest ranking version of the product from the matching group is selected 820 and sent for display to a user on the computing device.

Figures 9A, 9B:
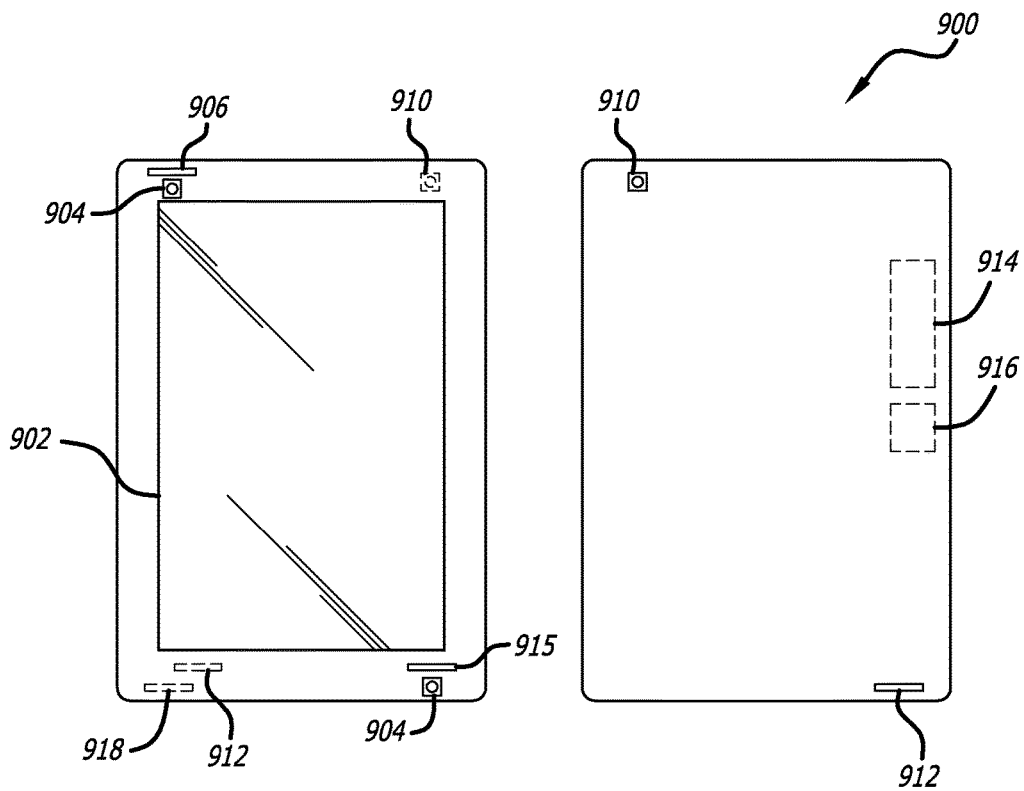
FIGS. 9A and 9B illustrate an example computing device that can be used to implement aspects of various embodiments.

FIGS. 9A and 9B illustrate front and back views, respectively, of an example electronic computing device 900 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 900 has a display screen 902 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 904 on the front of the device and at least one image capture element 910 on the back of the device. It should be understood, however, that image capture elements could also, or alternatively, be placed on the sides or corners of the device, and that there can be any appropriate number of capture elements of similar or different types. Each image capture element 904 and 910 may be, for example, a camera, a charge-coupled element (CCD), a motion detection sensor or an infrared sensor, or other image capturing technology.

As discussed, the device can use the images (e.g., still or video) captured from the imaging elements 904 and 910 to generate a three-dimensional simulation of the surrounding environment (e.g., a virtual reality of the surrounding environment for display on the display element of the device). Further, the device can utilize outputs from at least one of the image capture elements 904 and 910 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 915 on the front side, one microphone 912 on the back, and one microphone 906 on or near a top or side of the device. In some devices there may be only one microphone, while in other devices there might be at least one microphone on each side and/or corner of the device, or in other appropriate locations.

The device 900 in this example also includes one or more orientation- or position-determining elements 918 operable to provide information such as a position, direction, motion, or orientation of the device. These elements can include, for example, accelerometers, inertial sensors, electronic gyroscopes, and electronic compasses.

The example device also includes at least one communication mechanism 914, such as may include at least one wired or wireless component operable to communicate with one or more electronic or computing devices. The device also includes a power system 916, such as may include a battery operable to be recharged through conventional plug-in approaches, or through other approaches such as capacitive charging through proximity with a power mat or other such element. Various other elements and/or combinations are possible as well within the scope of various embodiments.

Figure 10:
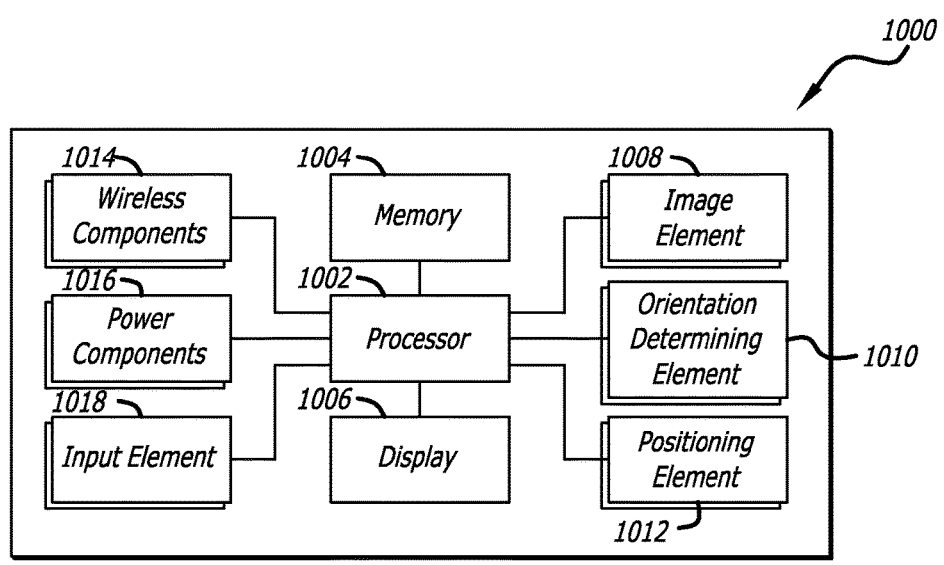
FIG. 10 illustrates example components that can be used with a device such as that illustrated in FIGS. 9A and 9B.

FIG. 10 illustrates a set of basic components of an electronic computing device 1000 such as the device 900 described with respect to FIG. 9. In this example, the device includes at least one processing unit 1002 for executing instructions that can be stored in a memory element or element 1004. As would be apparent to one of ordinary skill in the art, the device can include many types of memory, data storage, or computer-readable media, such as a first data storage for program instructions for execution by the processing unit(s) 1002, the same or separate storage can be used for images or data, a removable memory can be available for sharing information with other devices, and any number of communication approaches can be available for sharing with other devices.

The device typically will include some type of display element 1006, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1008, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1000 also includes at least one orientation determining element 1010 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1000. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1012 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 1014 operable to communicate with one or more electronic or computing devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1016, such as may include a battery operable to be recharged through conventional plug-in approaches, or through other approaches such as capacitive charging through proximity with a power mat or other such component. Various other elements and/or combinations are possible as well within the scope of various embodiments.

In some embodiments the device can include at least one additional input element 1018 able to receive conventional input from a user. This conventional input can include, for example, a push button, touch pad, touch screen, wheel, joystick, keyboard, mouse, keypad, or any other such component or element whereby a user can input a command to the device. These I/O elements could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

Figure 11:
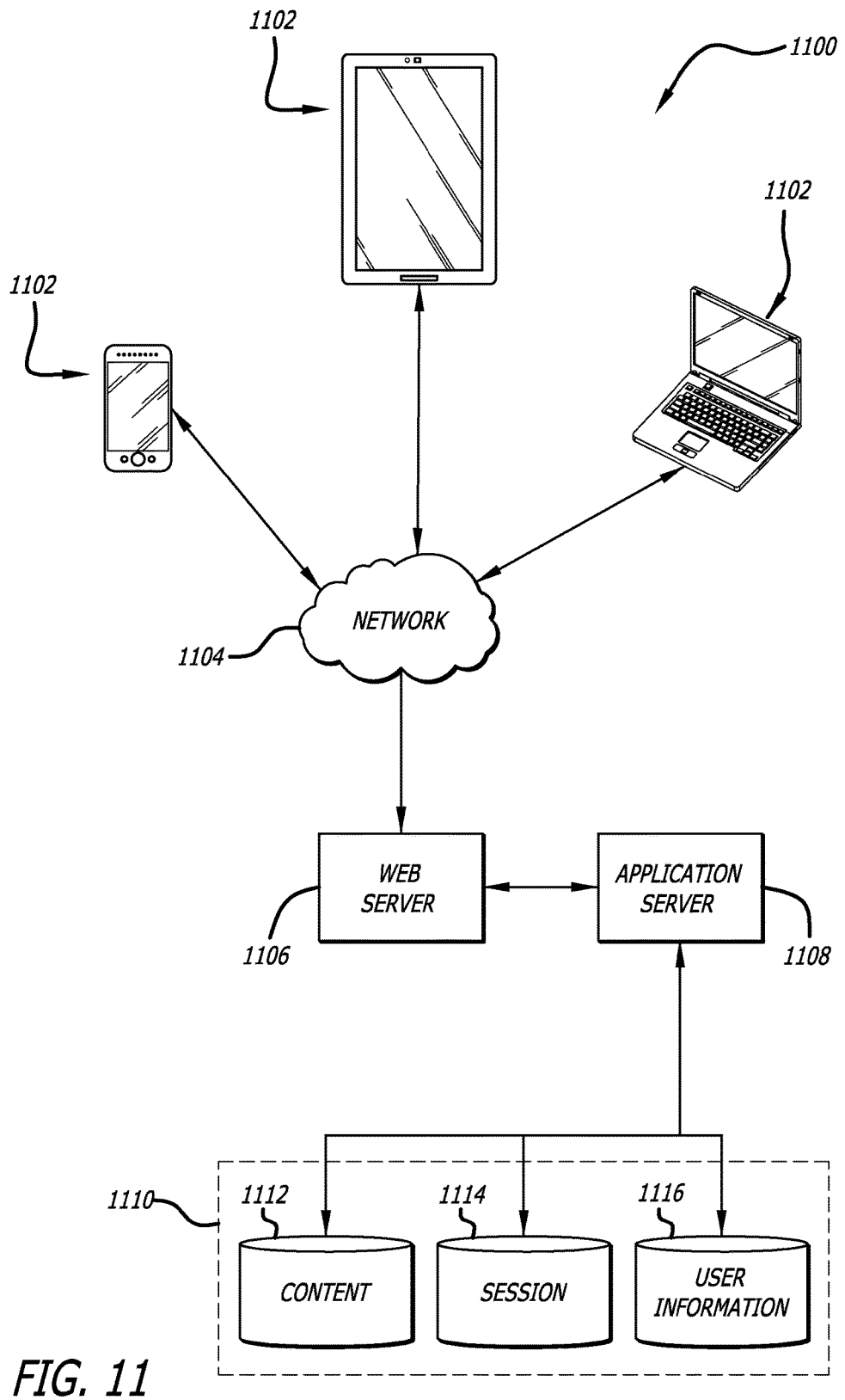
FIG. 11 illustrates an environment in which various embodiments can be implemented.

As discussed, different approaches can be implemented in various environments in accordance with the described embodiments. For example, FIG. 11 illustrates an example of an environment 1100 for implementing aspects in accordance with various embodiments. As will be appreciated, although a Web-based environment is used for purposes of explanation, different environments may be used, as appropriate, to implement various embodiments. The system includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1106 for receiving requests and serving content in response thereto, although for other networks, an alternative device serving a similar purpose could be used, as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1106 in the form of HTML, XML or another appropriate structured language in this example. The handling of all requests and responses, as well as the delivery of content between the client device 1102 and the application server 1108, can be handled by the Web server 1106. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing content (e.g., production data) 1112 and user information 1116, which can be used to serve content for the production side. The data store is also shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A non-transitory computer-readable storage medium storing instructions that, when executed by at least one processor, cause a computing device to:
    acquire inventory images of a plurality of products available for purchase from an electronic marketplace, wherein inventory features are extracted from each inventory image and an inventory visual word is assigned to each inventory feature to generate a vocabulary of visual words that describe the inventory features of the products represented in the inventory images;
    receive a query image from a computing device, wherein query features are extracted from the query image and a query visual word is assigned to extracted features;
    compare query visual words to at least a subset of the inventory visual words to identify a set of closest matching inventory images based at least in part on a respective number of query visual words matching a respective number of inventory visual words;
    classify the set of closest matching inventory images into a plurality of product groups based at least in part on overlapping visual words, each product group of the plurality of product groups including one or more versions of a respective product of the plurality of products available for purchase from the electronic marketplace;
    determine, using a geometric verification algorithm, one or more matching groups for the query image, wherein the geometric verification algorithm compares at least a subset of the query features to features of a representative image from each product group represented among the set of closest matching inventory images, each representative image representing global features common to each inventory image of a respective product group;
    rank different versions of the product assigned to the one or more matching groups based at least in part on at least one of a number of sales, freshness, seasonality, review count, projected shipping time, or user preferences; and
    send information for a highest ranking version of the product from the one or more matching groups for display on the computing device.

2. The non-transitory computer-readable storage medium of claim 1, wherein the instructions that, when executed by the at least one processor, further cause the computing device to:
    discard a product group of the plurality of product groups based at least in part on at least one of a median search score for the product group being below a threshold score.

3. The non-transitory computer-readable storage medium of claim 1, wherein the instructions that, when executed by the at least one processor, further cause the computing device to:
    store the inventory visual words in a lookup table including information corresponding to a location for a respective feature corresponding to each visual word.

4. A computer-implemented method, under the control of one or more computer systems configured with executable instructions, comprising:
- acquiring inventory images of a plurality of objects available for purchase from an electronic marketplace, wherein inventory features are extracted from individual inventory images and an inventory visual word is assigned to the inventory features to generate a vocabulary of visual words describing the inventory features of the plurality of objects represented in the inventory images;
- receiving a query image including a representation of an object, the object being one of a plurality of objects, wherein query features are extracted from the query image and a query visual word is assigned to individual extracted features;
- comparing query visual words to at least a subset of the inventory visual words to identify a set of closest matching inventory images based at least in part on a respective number of query visual words matching a respective number of inventory visual words;
- classifying the set of closest matching candidate images into a set of object groups based at least in part on overlapping visual words, each object group of the set of object groups including one or more versions of a respective object of the plurality of objects available through the electronic marketplace;
- determining, using a geometric verification algorithm, one or more matching groups for the query image, wherein the geometric verification algorithm compares at least a subset of the query features to features of a representative image from each object group represented among the set of closest matching candidate images, each representative image representing global features common to individual candidate images of a respective object group;
- ranking, based at least in part on at least one of a number of sales, freshness, seasonality, review count, projected shipping time, or user preferences; and
- selecting a highest ranking version of the object as a match for the query image.

5. The computer-implemented method of claim 4, further comprising:
- comparing first visual words of a first candidate image of the set of candidate images to second visual words of a second candidate image of the set of candidate images, wherein the first candidate image and the second candidate image are classified into a first object group based at least in part on a threshold number of overlapping visual words between the first visual words and the second visual words.

6. The computer-implemented method of claim 4, wherein selecting the highest ranking version further includes:
- scoring, based at least in part on attributes associated with the one or more matching groups, different versions of the object associated with the one or more matching groups; and
- selecting the highest scoring version of the object as a match for the query image.

7. The computer-implemented method of claim 4, further comprising:
- discarding an object group based at least in part on at least one of a median search score for the object group being below a minimum threshold score.

8. The computer-implemented method of claim 4, further comprising:
- acquiring inventory images of a plurality of object;
- extract features from each inventory image;
- cluster the features into clusters and assign a cluster center to represent each cluster of features; and
- assign an inventory visual word to each cluster center.

9. The computer-implemented method of claim 8, wherein different versions of a respective object are assigned to an object group for the respective object based at least in part on:
- classifying the inventory images into disjoint sets of equivalent images based at least in part on overlapping visual words.

10. The computer-implemented method of claim 8, further comprising:
- storing the inventory visual words in a lookup table including information corresponding to a location for a respective feature corresponding to each visual word.

11. A computing system, comprising:
a processor; and
memory including instructions that, when executed by the processor, cause the computing system to:
- acquire inventory images of a plurality of objects available for purchase from an electronic marketplace, wherein inventory features are extracted from individual inventory images and an inventory visual word is assigned to the inventory features to generate a vocabulary of visual words describing the inventory features of the plurality of objects represented in the inventory images;
- receive a query image from a computing device, the query image including a representation of an object, the object being one of a plurality of objects, wherein query features are extracted from the query image and a query visual word is assigned to individual extracted features;
- extract query features from the query image and assign a query visual word to the extracted features;
- compare query visual words to at least a subset of database visual words representing a plurality of object to identify a set of closest matching inventory images based at least in part on a respective number of query visual words matching a respective number of database visual words;
- classify, based at least in part on overlapping visual words, the set of closest matching inventory images into a set of object groups, each object group of the set of object groups including one or more versions of a respective object of the plurality of objects available through the electronic marketplace;
- determining, using a geometric verification algorithm, one or more matching groups for the query image, wherein the geometric verification algorithm compares at least a subset of the query features to features of a representative image from each object group represented among the set of closest matching database images, to determine one or more matching groups, from among the set of object groups, for the query image each representative image representing global features common to individual candidate images of a respective object group;
- rank, based at least in part on at least one of a number of sales, freshness, seasonality, review count, projected shipping time, or user preferences; and
- select a highest ranking version of the object as a match for the query image.

12. The computing system of claim 11, wherein the attributes associated with the one or more matching group include at least one of a number of sales, freshness, seasonality, review count, or projected shipping time.

13. The computing system of claim 11, wherein the instructions, when executed by the processor, further enable the computing system to:
   discard an object group based at least in part on at least one of a median search score for the object group being below a minimum threshold score.

14. The computing system of claim 11, wherein the instructions, when executed by the processor, further enable the computing system to:
   store the inventory visual words in a lookup table including information corresponding to a location for a respective feature corresponding to each visual word.

15. The computing system of claim 11, wherein different versions of a respective object are assigned to an object group for the respective object based in part on:
   classifying the inventory images into disjoint sets of equivalent images based at least in part on overlapping visual words.

* * * * *